Nov. 29, 1960 W. T. HALE 2,962,332
SEALING RING

Filed June 18, 1959 3 Sheets-Sheet 1

INVENTOR.
WILLIAM T. HALE.
BY C. Daniel Cornish
his ATTORNEY

Nov. 29, 1960     W. T. HALE     2,962,332
SEALING RING

Filed June 18, 1959     3 Sheets-Sheet 2

INVENTOR.
WILLIAM T. HALE.
BY C. Daniel Cornish
his ATTORNEY

Nov. 29, 1960 W. T. HALE 2,962,332
SEALING RING

Filed June 18, 1959 3 Sheets-Sheet 3

INVENTOR.
WILLIAM T. HALE.
BY
C. Daniel Cornish,
his
ATTORNEY.

United States Patent Office 2,962,332
Patented Nov. 29, 1960

2,962,332
SEALING RING

William T. Hale, Freeland, Md., assignor to Koppers Company, Inc., a corporation of Delaware Filed June 18, 1959, Ser. No. 821,262

5 Claims. (Cl. 309—46)

This invention relates generally to sealing rings and their method of manufacture.

A problem of leakage exists in high pressure hydraulic actuators wherein a piston reciprocates in a cylinder to produce a fluid pressure. The fluid which is under pressure has a tendency to leak between the piston and the cylinder. Such leakage, of course, is undesirable because it reduces the pressure on the piston. Conventionally, sealing rings which fit within grooves in the piston and bear against the cylinder wall are used to reduce or eliminate this leakage. To permit the ring to vary in diameter so as to maintain contact with the cylinder wall and the piston, these rings are usually of the discontinuous type, that is, each ring is cut so as to provide a gap which substantially closes into a joint, if the ring is placed in the cylinder. Since a single sealing ring has the disadvantage of permitting excessive leakage at the joint formed by the gap, the rings are usually used in two pieces, that is, an inner ring and an outer ring which coact to form a single seal with the joints of these rings displaced 180° apart.

The sides of the ring which bear against the piston must be parallel so as to completely seat against both sides of the groove in the piston, and this has presented a problem in the manufacture of the rings. When the gap was cut in the ring so as to allow for change in diameter of the ring, it has been difficult to mill the gap to form a joint and yet have the sides of the ring that are adapted to abut the piston remain parallel while maintaining contact in the joint. These difficulties are due to numerous factors such as wear on the milling machine, wear of the cutters, variation in the sharpness of the cutters, variations in the material cut, changes in ambient temperaure, etc. This has lead to a substantial number of rejects in production and excessive production costs.

An object of the invention, therefore, is to provide a novel ring of the discontinuous type wherein the faces adapted to contact the piston are parallel while the surfaces of the joint are in contact.

A further object of the invention is to provide a novel method of providing a discontinuous type ring which comprises forming a ring with parallel side surfaces and cutting the ring transversely and at a bias to said parallel surfaces to form a ring whose terminal ends have surfaces biased relative to the ring sides whereby, when the ends of said ring are brought together to contact said biased surfaces and the sides of the ring are brought into parallel planes, any under cutting of said biased surfaces manifests itself as a change in external and internal diameters of the ring.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Referring to the drawings wherein like parts are marked alike:

Figure 1:
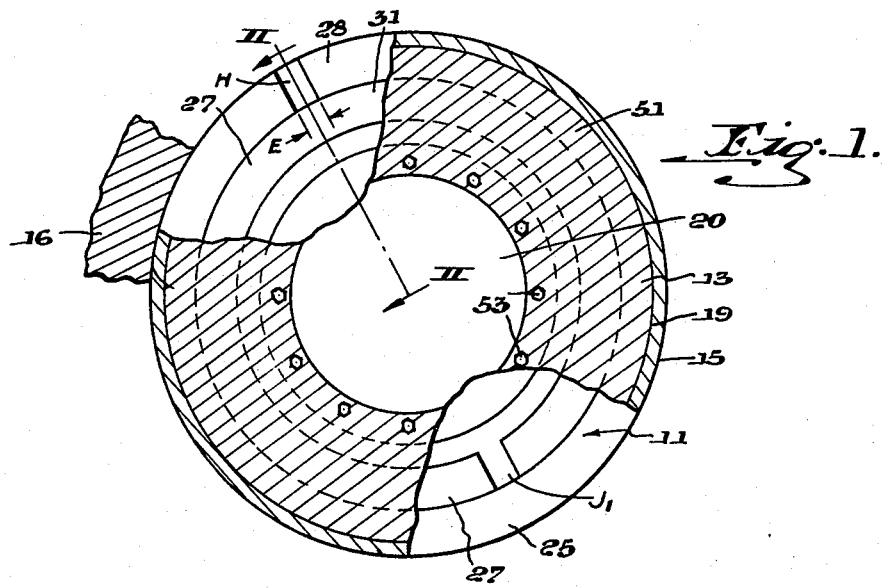
Fig. 1 is a partial top view partially cut away of the ring of this invention mounted in a fluid actuating cylinder.
Figure 2:
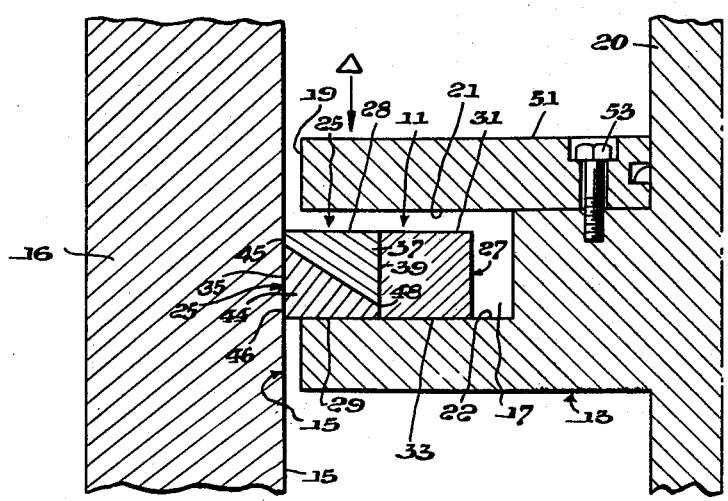
Fig. 2 is a partial cross section of Fig. 1 through section II—II.

In one advantageous application, ring assembly 11, Figs. 1 and 2, operates between a piston 13 and a cylinder wall 15 of a conventional fluid actuator. Movement of the piston in one direction compresses a fluid and creates a fluid pressure in cylinder 16. The tendency of this compressed fluid to leak between the piston and cylinder wall is prevented by the ring assembly 11, which lies in a groove 17 in piston 13.

Ring groove 17, which runs continuously around face 19 of piston 13 is substantially rectangular in cross section, as shown in Fig. 2. The piston may have a rod 20. Two flat parallel sides 21 and 22 of groove 17 are disposed at right angles to cylinder wall 15 and act as seating surfaces for ring assembly 11. Thus, ring 11 reposes between the piston 13 and cylinder wall 15 even though the piston is reciprocated relative to the cylinder wall by rod 20.

Ring assembly 11 comprises an outer ring 25 and an inner ring 27. These rings have parallel flat sides 28, 29, 31 and 33 which seat against the sides of ring groove 17. Thus, when piston 13 is moved in one direction, sides 28 and 31 seat against side 21 of ring groove 17; and when the piston 13 is moved in the opposite direction, sides 29 and 33 seat against side 22 of ring groove 17. When assembled in cylinder 16, outside longitudinal surface or face 35 of ring 25 is cylindrical to seat evenly against cylinder wall 15 and outside longitudinal surface 37 of ring 27 and inside longitudinal surface 39 of ring 25 are cylindrical so that surfaces 37 and 39 evenly seat against each other.

Figure 4:
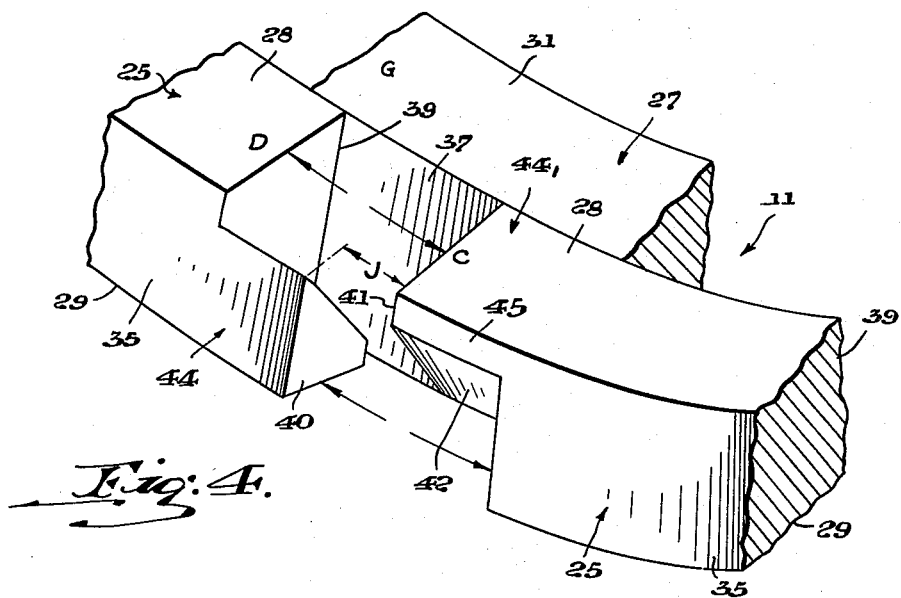
Fig. 4 is a partial isometric view of the ring of Fig. 3 in its noncompressed state.
Figure 5:
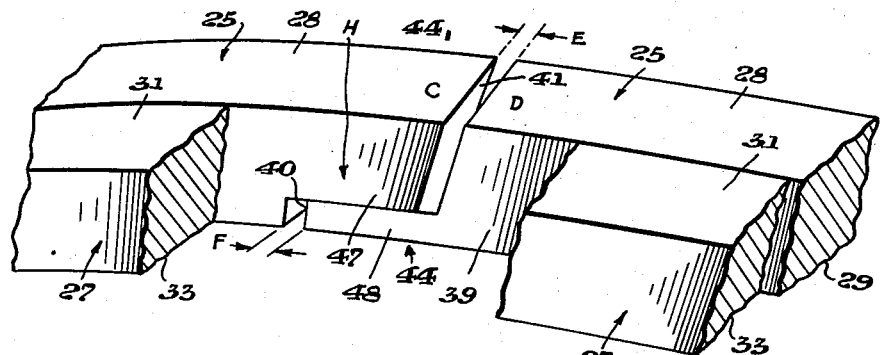
Fig. 5 is a partial isometric view from inside the outer and inner rings of Fig. 1 as compressed in a cylinder.
Figure 6:
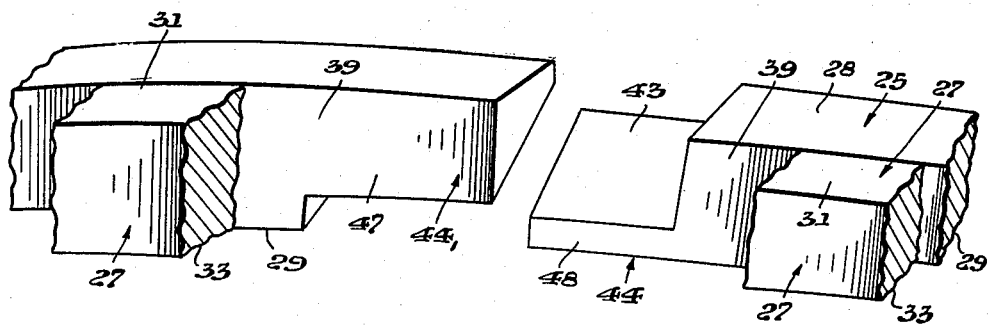
Fig. 6 is a partial isometric view of the ring of Fig. 5 in its noncompressed state.

The bore of the cylinder wall 15 varies in diameter, for example, due to expansion and contraction. So that rings 25 and 27 can change in diameter to maintain contact between outer ring 25 and cylinder wall 15 and between outer ring 25 and inner ring 27, the rings are noncontinuous and are provided with gaps J and $J_1$ (Figs. 1, 4 and 6). Advantageously, the gap J of ring 25 is displaced 180° from the gap $J_1$ of ring 27 and gap J is closed when ring 25 is compressed by cylinder wall 15 to form overlapping joint H. The displacement of gaps J and $J_1$ is not critical but may be varied so long as the inner ring 27 contacts ring 25 completely across gap J. As illustrated herein, the gap of ring 27 is made by cutting ring 27 transversely to side 31, but this cutting is not critical and may be oblique so long as ring 27 is free to change in diameter while its sides 31 and 33 remain in parallel planes.

The foregoing has described a conventional fluid actuator having a sealing ring means for preventing the leakage of pressure fluid from a high pressure side of a piston to a low pressure side. It has been difficult heretofore to produce a noncontinuous type ring whose sides are parallel so as to completely seat on parallel sides of the piston. These difficulties have been due to the milling or forming of the gap making the ring noncontinuous.

Figure 3:
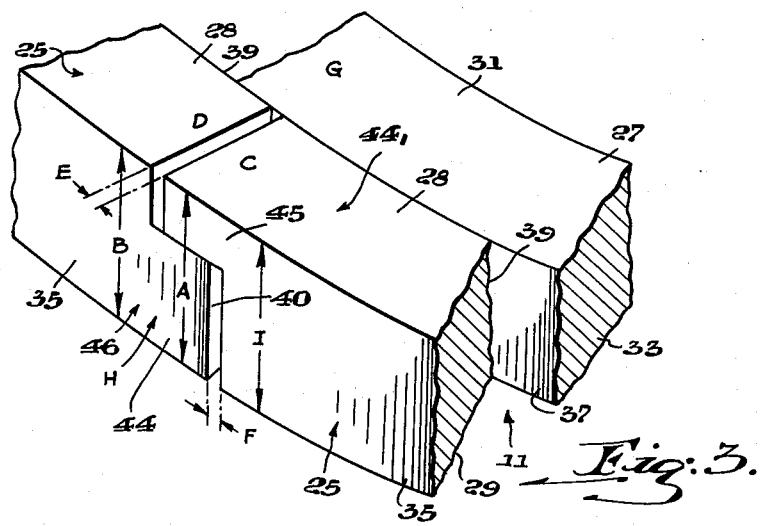
Fig. 3 is a partial isometric view from outside of the outer ring and inner ring of Fig. 1 as compressed in a cylinder.

In accordance with this invention, ring 25 has a gap J formed between ends 40 and 41. Cooperating sealing surfaces 42 and 43 adjacent gap J are provided adjacent ends 40 and 41 so that closing gap J forms joint H which has end clearances E and F and wherein surfaces 42 and 43 contact each other. The surfaces 42 and 43 are cut on parallel biases to the sides 28 and 29 of ring 25 to form legs 44 and $44_1$. Advantageously the bias angle of surface 42 is 30° with reference to side 28 with a ring 25 which is adapted to operate in a 1⅞ inch diameter cylinder bore. This angle may be greater or less so long as dams 45 and 46, which are extensions of face 35, and dams 47 and 48, which are extensions of surface 39, remain in width substantially as shown in Figs. 3–6, i.e., the dams on each end of ring 25 remain different in widths. It is to be noted that, as shown in Figs. 3–6, dams 45 and 48 are thin and dams 46 and 47 are relatively thick but this can be the opposite by changing the angle of biased surfaces 42 and 43 to be tapered in the opposite direction, as by simply flipping the ring over. Surfaces 42 and 43 must contact each other when ring side surfaces 28 or 29 are in contact with the sides of ring groove 17 in order for ring assembly 11 to seal properly. For example, as shown in Fig. 3, if dimension A is greater than dimension B when surfaces 42 and 43 are in contact, such as is produced by undercutting at the joint, a high step will be present so that surface C will and surface D will not contact the side of ring groove 17, thus providing a possible leakage path across surface D. In contrast, if dimension A is less than dimension B when surfaces 42 and 43 are in contact, such as is produced by overcutting at the joint, a low step will be present so that when surfaces C and D contact side 21 of ring groove 17, surfaces 42 and 43 will not contact each other, thus providing a possible leakage path between surfaces 42 and 43. Similar leakage paths will also be present when there is too much high or low step relative to dimensions A and I and ring assembly 11 is seated against side 22 of ring groove 17.

In order to seal against leakage through end clearances E and F of the joint ring 25, surfaces D, C and G must be in contact with side 21 when ring assembly 11 is seated against side 21 of ring groove 17. Similarly, the opposite axial surfaces of rings 25 and 27 must be in contact with side 22 of ring groove 17 when ring assembly 11 is seated against side 22 of ring groove 17. It is advantageous that the longitudinal surfaces 37 and 39 should not be more than about .001 inch different in width because it has been found in operation that the amount of relative movement between surfaces 37 and 39 is limited. Also, in order to seal end clearances E and F, surface 35 must be in seating contact with cylinder wall 15 and surface 39 must be in seating contact with surface 37 across joint H. Dams 45 and 46, extensions of face 35, also seat evenly against cylinder wall 15 and dams 47 and 48, extensions of surface 39, seat evenly against surface 37 of inner ring 27.

In operation, by expanding ring 27 over piston face 19, ring 27 fits into ring groove 17. Thereafter, by expanding ring 25 in like manner the latter fits into ring groove 17 so that surfaces 37 and 39 contact each other to form ring assembly 11. The side 51 of piston 13 may also be removed and reassembled by means of bolts 53 to fit ring assembly 11 in ring groove 17. By compressing ring assembly 11, the piston and ring assembly 11 fit into cylinder 16 so that face 35 and cylinder surface 15 contact each other to prevent leakage between face 35 and cylinder surface 15 except at the joint H of ring 25. The contact of ring side surfaces 28, 29, 31 and 33 with the side of ring groove 17 prevents leakage between the side surfaces and piston 13 along the side of the ring groove 17 upon which the ring assembly 11 is seated and this contact, together with the contact of longitudinal surfaces 37 and 39, prevent leakage through end clearances E and F of the joint H of ring 25. Surfaces 42 and 43 contact each other to prevent leakage therebetween.

With the ring assembly of this invention, it has been found possible to mass produce, with little or no scrap, two piece ring assemblies that will, for example, exhibit a maximum leakage of ten cubic centimeters per minute of kerosene which is at atmospheric temperatures and which is under a pressure of 750 pounds for square inch pressure.

The ring assembly of this invention has the advantage of strength at its joints. For example, should a piece of dirt or other foreign matter get caught between surfaces 42 and 43 so that surface C will contact side 21 of ring groove 17 but surface D will not, a sudden pressure applied to ring assembly 11 would cause surfaces 42 and 43 to slide relative to each other, thus to prevent the overlapping leg portions of the joint from breaking.

The ring assembly of this invention can be made for much smaller cylinder diameters than with rings known heretofore and for thinner ring grooves than with rings known heretofore. For example, a ring assembly, according to the invention, can be made small enough for ¼ inch cylinder diameters and also can be made to fit 1⁄16 inch wide ring grooves.

In the manufacture of sealing rings heretofore, continuous rings were cut transversely on adjacent top and bottom portions and at right angles to the ring sides and this produced spaced ends defining a gap and joint surfaces substantially parallel to the ring sides which were adapted to form an overlapping joint. Thereafter, the sides of the rings were ground to make the sides parallel. Heretofore, however, there was great difficulty in producing a joint in the ring whereby, without further manufacture, there could be contact between the joint surfaces and parallelism between the ring side surfaces, hereinafter referred to as the "required displacement."

In accordance with the method of this invention, two adjacent portions of continuous rings which are rectangular in cross section so as to have parallel sides and a face and inside surface are transversely cut at a bias to the ring sides, advantageously by milling, to produce simultaneously spaced ends defining a gap, two biased joint surfaces which are adapted to form an overlapping joint and sealing dams of different widths on the outside and inside diameters of the ring at each end thereof and which are extensions of the face and opposite inside surface of the ring respectively. In the last mentioned cutting step, the biased surfaces are undercut so that when the ends of the rings are brought together to contact said biased joint surfaces and the sides of the ring are brought into parallel planes, the undercutting of said biased surfaces manifests itself as a change in external diameters of the ring. The sides of the rings are then brought into parallel planes while closing the gap and maintaining an overlapping contact between the biased joint surfaces, advantageously by holding each ring between parallel surfaces. This gives the required displacement; the rings, however, are not cylindrical on their inside and outside diameters. Thereafter, the rings may be made cylindrical while having the "required displacement" by turning and boring the held rings.

In accordance with another method of this invention, the sides of continuous rings which have a face and inside surface are provided with flat and parallel axial sides at right angles to the face and inside surface, advantageously by grinding. Transversely cutting two adjacent portions of the rings at a bias to the ring sides produces simultaneously spaced ends defining a gap, two biased joint surfaces which are adapted to form an overlapping joint and sealing dams of different widths on the outside and inside diameters of the ring at each end thereof. In the last mentioned cutting step, the biased joint surfaces are undercut whereby, when the ends of the rings are brought together to contact said biased joint surfaces, the sides of the ring will not be in parallel planes; however, the sides may be brought into parallel planes by sliding the biased joint surfaces relative to each other, thus to change the external and internal diameter of the ring. Consequently, when the ends of the ring are brought together to contact said biased joint surfaces and the sides of said ring are brought into parallel planes, the undercutting of said biased joint surfaces manifests itself as a change in external diameter of the ring. The sides of the ring are then brought into parallel planes while closing the gap and maintaining an overlapping contact between the biased joint surfaces, advantageously by locking up a plurality of outers in an arbor whereby the rings have the "required displacement." At first, the locking up causes the biased joint surfaces to slide relative to each other so that the ends of the rings will move in an axial direction, and after the sides of the rings are brought into parallel planes, any further locking up causes the rings to be held more tightly. It is understood from this that in the locked condition, the outers will not be cylindrical. Then the rings are made cylindrical, advantageously by turning and boring to finished diameters while the rings are locked up, after which steps the rings produced will have the "required displacement" by putting the rings in a cylinder of the proper size and against the side of a ring groove.

In another method of this invention, the sides of a continuous ring are made parallel and planer. Then an eccentric cylindrical outside face at right angles to the sides is formed on the rings. Advantageously "cam turning" the rings on their outside produces the required outside configuration. This "cam turning" step compries moving a cutting tool longitudinally along the face of the ring as the ring rotates around its axis and simultaneously moving the tool axially inwardly and outwardly at predetermined intervals and for predetermined small distances by means of a rotating eccentric cam upon which the tool is slideably engageable. A marking step comprises marking the ring as with a sharp tool at a place for making a gap in the ring so that after a cutting step, which removes a portion of the ring at the marked place to form a gap in the ring and after closing up of the gap, the ring will be cylindrical on its outside diameter. Transversely cutting at a bias to the ring sides, two adjacent portions of the rings at the marked place simultaneously produces spaced ring ends defining a gap, two biased surfaces which are adapted to form an overlapping joint and sealing dams of different widths on the outside and inside diameters of the ring at each end thereof and which are extensions of the face and opposite inside surface of the ring respectively. In the last mentioned cutting step, the biased joint surfaces are undercut whereby, when the ends of the rings are brought together to contact said biased surfaces and the sides of the ring are brought into parallel planes, the undercutting of said biased surfaces manifests itself as a change in external diameter of the ring. The final steps are the same as the above mentioned sequence, namely, the ends of the ring are brought together to contact the biased joint surfaces and the sides of the rings are brought into parallel planes to slide the biased joint surfaces relative to each other as the sides of the ring are brought into parallel planes whereby the external and internal diameters of the ring are changed. Thereafter, the ring outside and inside diameters are finished to be circular while the ring sides remain in parallel planes and while the joint biased surfaces remain in contact with each other.

In still another method of this invention, a hollow cylindrical metal member is formed from materials from which sealing rings are conventionally made. For example, such a member is cast from steel or cast iron in a conventional manner. If steel is used the member is hardened by heating and then quickly cooling, advantageously by quenching in a fluid. If cast iron is used, the same hardening step is not necessary. Turning, boring and then cutting the pot transversely in spaced planes normal to its axis produces semifinished rings having substantially planer sides. Thereafter, the sides of the rings are made flat and parallel. Then the rings are turned to be eccentric on their outside diameters and then are marked at a place for cutting a gap so that, when the rings are cut at the marked place to produce a gap defined by two free ends, the gap may be closed to make the outside of the ring substantially circular. Transversely cutting two adjacent portions of the ground rings at a bias to the ring sides of the marked place then produces two biased joint surfaces, which are adapted to form overlapping joints and sealing dams of different widths on the outside and inside diameters of the ring at each of the ends of the ring, which dams are extensions of the face and opposite inside surface respectively of the ring. In the last mentioned cutting step, the biased joint surfaces are undercut so that, when the ends of the rings are brought together to contact the biased joint surfaces and the sides of the rings are brought into parallel planes, the undercutting of said biased surfaces manifests itself as a change in the external and internal diameters of the ring. Portions of the ends of the rings are then removed to increase slightly the gap between the ends of the rings. The material removed in this last step is sufficient to prevent butting at the ends when the ring gap is closed to make the ring substantially circular on its outside. The sides of the ring are then brought into parallel planes while closing the gap to maintain overlapping contact between the biased joint surfaces and so that the biased joint surfaces slide relative to each other to move the ends of the rings axially. Thereafter, the rings on their inside and outside diameters are finished to be circular while the ring sides remain in parallel planes and while the joint biased surfaces remain in contact with each other.

The finishing of the longitudinal sides by grinding after the joints were cut, as was known heretofore, is not necessary with the embodiments or methods of this invention. Elimination of this grinding step is especially advantageous because such grinding entails flipping the ring from one side to the other in separate grinding operations which is very expensive and time consuming. For example, it has been estimated that the elimination of such a grinding operation saves about ten cents per ring in manufacturing cost. Moreover, it was difficult heretofore to produce the "required displacement" with such a grinding operation. This is so because it is difficult to maintain contact between the biased joint surfaces while making both longitudinal side surfaces of the ring parallel by grinding. For example, in grinding ring 25 after it is cut therein, the ring must be held while dimensions A and B are changed, then the ring must be released and reheld while dimensions A and I are changed, making a total of four dimension changes and two holding steps interrupted by a releasing operation. In accordance with this invention, it is relatively much more simple and effective to maintain contact between the joint surfaces and maintain the ring side surfaces parallel by simply locking up the ring in an arbor so as to slide the joint biased surfaces relative to each other and then making the ring cylindrical by turning and boring, making a total of only two dimension changes and one holding operation. In addition, the manufacture of the rings of this invention has the advantage that a wide tolerance is provided in cutting the biased surface of the joint so that scrap is considerably reduced. It is to be noted that, when grinding the sides of a compressed ring, there was sometimes enough working in the joint to produce low step.

In producing rings with overlapping joints, it may be desirable initially and from time to time after the gaps in the first rings in a series are cut, to check the interference of the joint surfaces. One advantageous way of doing this is to place a finished ring in a precision ring gauge, bored and ground on its inside diameter to the size of the cylinder in which the ring is adapted to operate. The ring is then pushed down in the ring gauge against a flat plate to make the bottom sides of the ring parallel. Thereafter, the joint of the outer is pushed off the flat plate and the joint surfaces 41 and 43 are made to contact. Following this step, the dimensions A and B are measured, for example, with micrometer calipers or a calibrated indicator gauge. If dimension A is greater than dimension B, the ring has high step. If dimension A is less than dimension B, the ring has low step. Similar measuring of the high and low steps are made of dimensions A and I after flipping over the ring and ring gauge. If dimension A is less than dimension I, the ring has low step, if dimension A is more than dimension I, the ring has high step.

The ring assembly of this invention has many advantages but among its primary advantages are that it seals a fluid pressure very effectively in two directions and is inexpensive to produce.

What is claimed is:

1. A two piece sealing ring comprising an expandable outer ring of rectangular cross section along its length and having two terminal abuttable ends, said outer ring including two parallel first axial sealing surfaces and two first inner and outer cylindrical longitudinal sealing surfaces, said first axial and longitudinal surfaces having at one of said terminal ends a first leg and at the other terminal end a second leg separated by an end clearance, said first leg being formed with a second surface biased relative to said first longitudinal surfaces so as to intersect said inner and outer longitudinal surfaces and provide sealing dams of different widths less than the width between said axial sealing surfaces on said inner and outer longitudinal surfaces, said second leg being formed with a third surface biased relative to said first longitudinal surfaces so as to intersect said inner and outer longitudinal surfaces and provide sealing dams of different widths less than the width between said parallel axial sealing surfaces on said inner and outer longitudinal surfaces, said second and third biased surfaces being adapted to overlap and contact each other so as to form a closed joint having complemental sealing surfaces so that said first and second axial surfaces lie in parallel planes, and an inner expandable ring having fourth and fifth axial surfaces connected by a fourth outer longitudinal sealing surface of substantially the same width as said first inner longitudinal surface and which is adapted to contact said first inner longitudinal surface so as to overlap both legs of said outer ring.

2. A piston ring adapted to be seated between a piston and a cylinder wall, comprising two parallel first flat sides, a first outside cylindrical surface normal to said first sides and adapted to contact evenly said cylinder wall, a first inside cylindrical surface substantially parallel to said first outside surface, said first cylindrical surfaces being non-continuous so as to form ends between which there is a gap and having opposite inside and outside sealing dams of different widths formed on said first inside cylindrical surfaces adjacent each end, and second surfaces at a bias to said first sides and connecting said first surfaces between said dams so that said second surfaces are adapted to contact each other by overlapping said ends to form a joint while said first sides are parallel and while said first outside surface is in contact with said cylinder wall.

3. A piston ring adapted to be seated between a piston and a cylinder wall comprising a ring with parallel side surfaces having ends between which there is a gap, said ring adjacent said ends having surfaces at a bias to said sides which terminate in sealing dams of different widths, each of said dams being normal to said sides and adapted to contact said cylinder wall, said bias surfaces adapted to contact each other by overlapping said ends to form a joint while said dams contact said cylinder wall and said sides are parallel.

4. A piston ring joint on the terminal ends of an expandable piston ring having radially spaced coaxial inner and outer cylindrcial walls which are connected by spaced parallel radial sides so as to define a piston ring of substantial uniform rectangular cross-section along its length, said joint comprising complementary legs extending in overlapping relationship from said abuttable terminal ends, and slidably engaging surfaces cut diagonally through both said inner and outer cylindrical walls so that said complementary legs are both formed with inner and outer sealing dams.

5. A piston ring joint on the terminal ends of an expandable piston ring having radially spaced coaxial inner and outer cylindrical walls which are connected by spaced parallel radial walls so as to define a piston ring of substantial uniform rectangular cross-section along its length, said joint comprising complementary legs extending in overlapping relationship from said abuttable terminal ends, and slidably engaging surfaces cut diagonally through both said inner and outer cylindrical walls so that said complementary legs are formed with inner and outer sealing dams of which the sum of the widths of said sealing dams on said outer cylindrical surface is equal to the sum of the widths of the sealing dams on said inner cylindrical surface.

References Cited in the file of this patent

UNITED STATES PATENTS

| | | |
|---|---|---|
| 615,902 | Raworth | Dec. 13, 1898 |
| 1,756,905 | Morton | Apr. 29, 1930 |
| 1,930,857 | Morton | Oct. 17, 1933 |
| 1,964,156 | Hoern | June 26, 1934 |
| 2,092,413 | Farmer | Sept. 7, 1937 |
| 2,860,935 | Frentzen | Nov. 18, 1958 |